US012754646B1

(12) United States Patent
Chen et al.

(10) Patent No.: US 12,754,646 B1
(45) Date of Patent: Oct. 6, 2026

(54) ELECTROMAGNETIC VIBRATION TOUCH DEVICE

(71) Applicant: SUNREX TECHNOLOGY CORP., Taichung City (TW)

(72) Inventors: Chun-Chieh Chen, Taichung City (TW); Ching-Yao Huang, Taichung City (TW); Chih-Hsien Yao, Taichung City (TW); Shi-Ming Chen, Taichung City (TW)

(73) Assignee: SUNREX TECHNOLOGY CORP., Taichung City (TW)

( * ) Notice: Subject to any disclaimer, the term of this patent is extended or adjusted under 35 U.S.C. 154(b) by 0 days.

(21) Appl. No.: 19/309,751

(22) Filed: Aug. 26, 2025

(30) Foreign Application Priority Data

Apr. 30, 2025 (TW) ................................ 114116361

(51) Int. Cl.
*G06F 3/046* (2006.01)
*G06F 3/01* (2006.01)

(52) U.S. Cl.
CPC .............. *G06F 3/046* (2013.01); *G06F 3/016* (2013.01)

(58) Field of Classification Search
CPC ................................. G06F 3/046; G06F 3/016
See application file for complete search history.

(56) References Cited

U.S. PATENT DOCUMENTS

2012/0103773 A1* 5/2012 Villain ................ G06F 3/03547 200/344
2018/0266849 A1* 9/2018 Chen ........................ G08B 6/00
2022/0028629 A1* 1/2022 Thrien ................... B60K 35/60
2024/0427437 A1* 12/2024 Wang .................... G06F 1/1662

* cited by examiner

*Primary Examiner* — Antonio Xavier
(74) *Attorney, Agent, or Firm* — Thomas | Horstemeyer, LLP

(57) ABSTRACT

An electromagnetic vibration touch device includes a base unit and a touch circuit board unit. The base unit includes a base body, outer arms and outer connection members connected to the outer arms, inner arms and inner connection members connected to the inner arms, and a lower electromagnetic member connected to the base body. The touch circuit board unit includes a circuit board body connected to the outer connection members and the inner connection members, a touch circuit disposed on the circuit board body, and an upper electromagnetic member connected to the circuit board body and facing the lower electromagnetic member. The touch circuit board is electrically connected to the lower electromagnetic member and the upper electromagnetic member and is operable for generating a magnetic repulsive force between the lower electromagnetic member and the upper electromagnetic member.

8 Claims, 6 Drawing Sheets

ELECTROMAGNETIC VIBRATION TOUCH DEVICE

CROSS-REFERENCE TO RELATED APPLICATION

This application claims priority to Taiwanese Invention Patent Application No. 114116361, filed on Apr. 30, 2025, the entire disclosure of which is incorporated by reference herein.

FIELD

The disclosure relates to a touch device, and more particularly to an electromagnetic vibration touch device.

BACKGROUND

An existing touch device currently serves as an input device of a computer. The existing touch device includes a touch circuit board, a base seat, and a stroke module (e.g., a spring, a spring plate, a silicone pad, etc.) interconnecting the touch circuit board and the base seat. The touch circuit board is driven by the stroke module to move toward the base seat.

However, after prolonged use, the stroke module is prone to wear, so the tactile feedback is less sensitive. There is room for improvement on the existing touch device.

SUMMARY

Therefore, an object of the disclosure is to provide an electromagnetic vibration touch device that can alleviate at least one of the drawbacks of the prior art.

According to the disclosure, the electromagnetic vibration touch device includes a base unit and a touch circuit board unit.

The base unit includes a base body, a plurality of outer arms, a plurality of outer connection members, a plurality of inner arms, a plurality of inner connection members, and at least one lower electromagnetic member. The base body defines an inner opening. The plurality of outer arms are fixedly connected to an outer end of the base body, are flexible, and extend in a left-right direction. The plurality of outer connection members are respectively and fixedly connected to the plurality of outer arms. The plurality of inner arms are fixedly connected to an inner end of the base body, are flexible, and extend in the left-right direction into the inner opening. The plurality of inner connection members are respectively and fixedly connected to the plurality of inner arms. The at least one lower electromagnetic member is fixedly connected to a top end of the base body.

The touch circuit board unit includes a circuit board body, a touch circuit, and at least one upper electromagnetic member. The circuit board body is fixedly connected to the plurality of outer connection members and the plurality of inner connection members. The touch circuit is disposed on the circuit board body. The at least one upper electromagnetic member is fixedly connected to a bottom end of the circuit board body, and faces the at least one lower electromagnetic member. The touch circuit board is electrically connected to the at least one lower electromagnetic member and the at least one upper electromagnetic member and is operable for generating a magnetic repulsive force between the at least one lower electromagnetic member and the at least one upper electromagnetic member in a top-bottom direction substantially perpendicular to the left-right direction.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
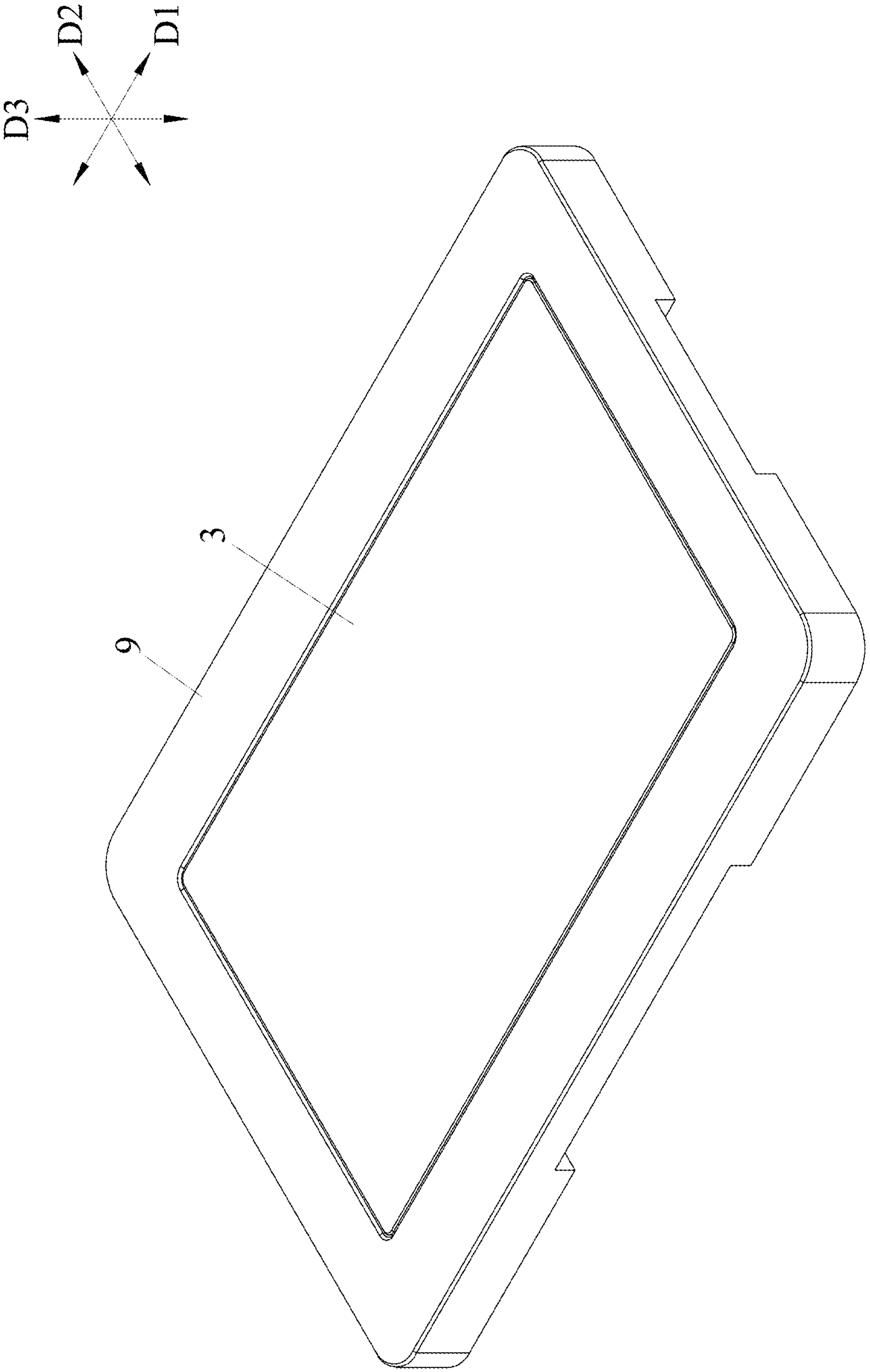
FIG. 1 is a perspective view illustrating an electromagnetic vibration touch device according to an embodiment of the disclosure being mounted to a mount seat.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
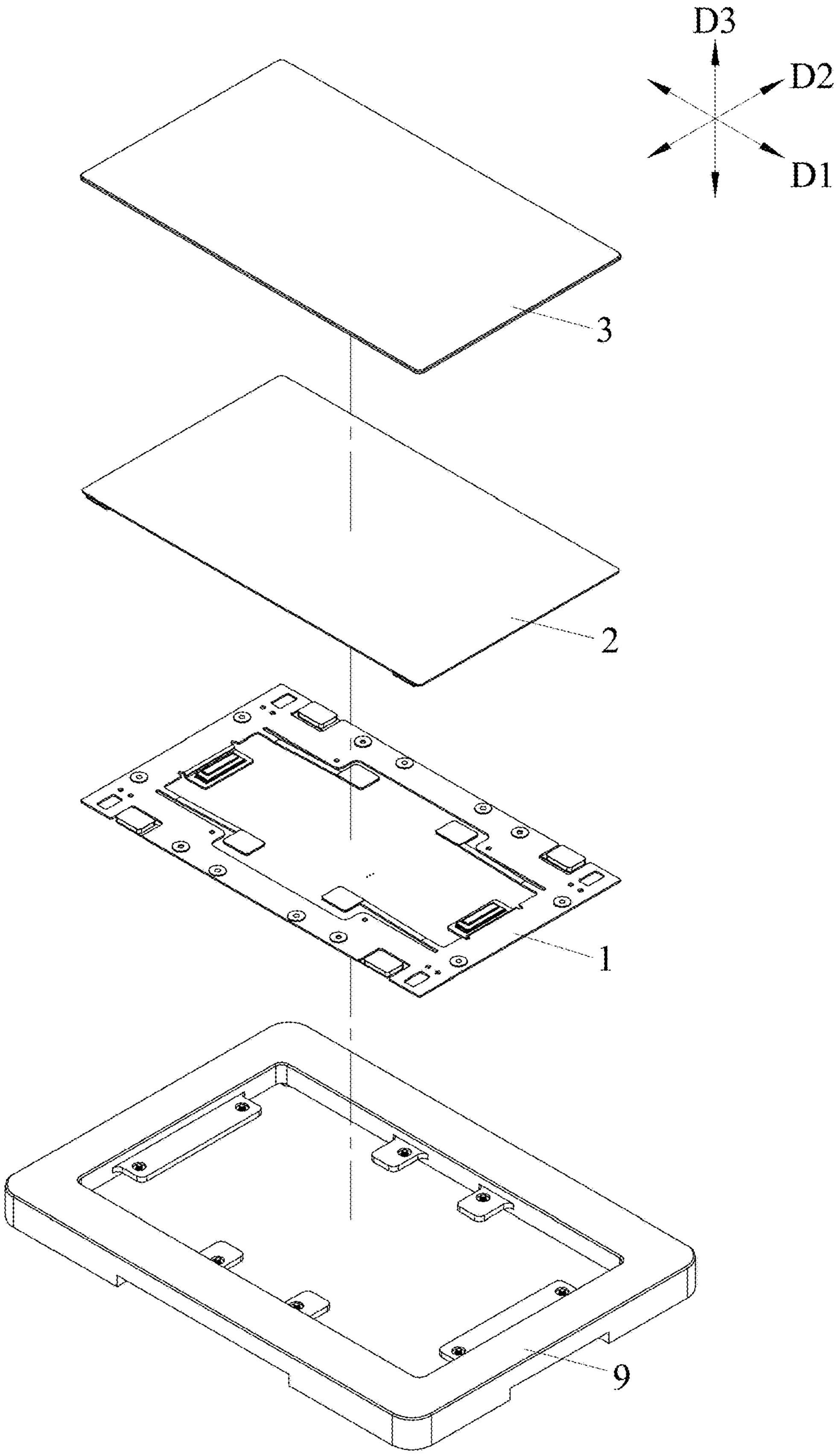
FIG. 2 is an exploded perspective view of the embodiment illustrating the electromagnetic vibration touch device and the mount seat.

Referring to FIGS. 1 and 2, an electromagnetic vibration touch device according to an embodiment of the disclosure is adapted to be mounted to a mount seat 9 of a notebook computer (not shown).

The electromagnetic vibration touch device of the disclosure includes a base unit 1, a touch circuit board unit 2, and a cover plate 3.

Figure 3:
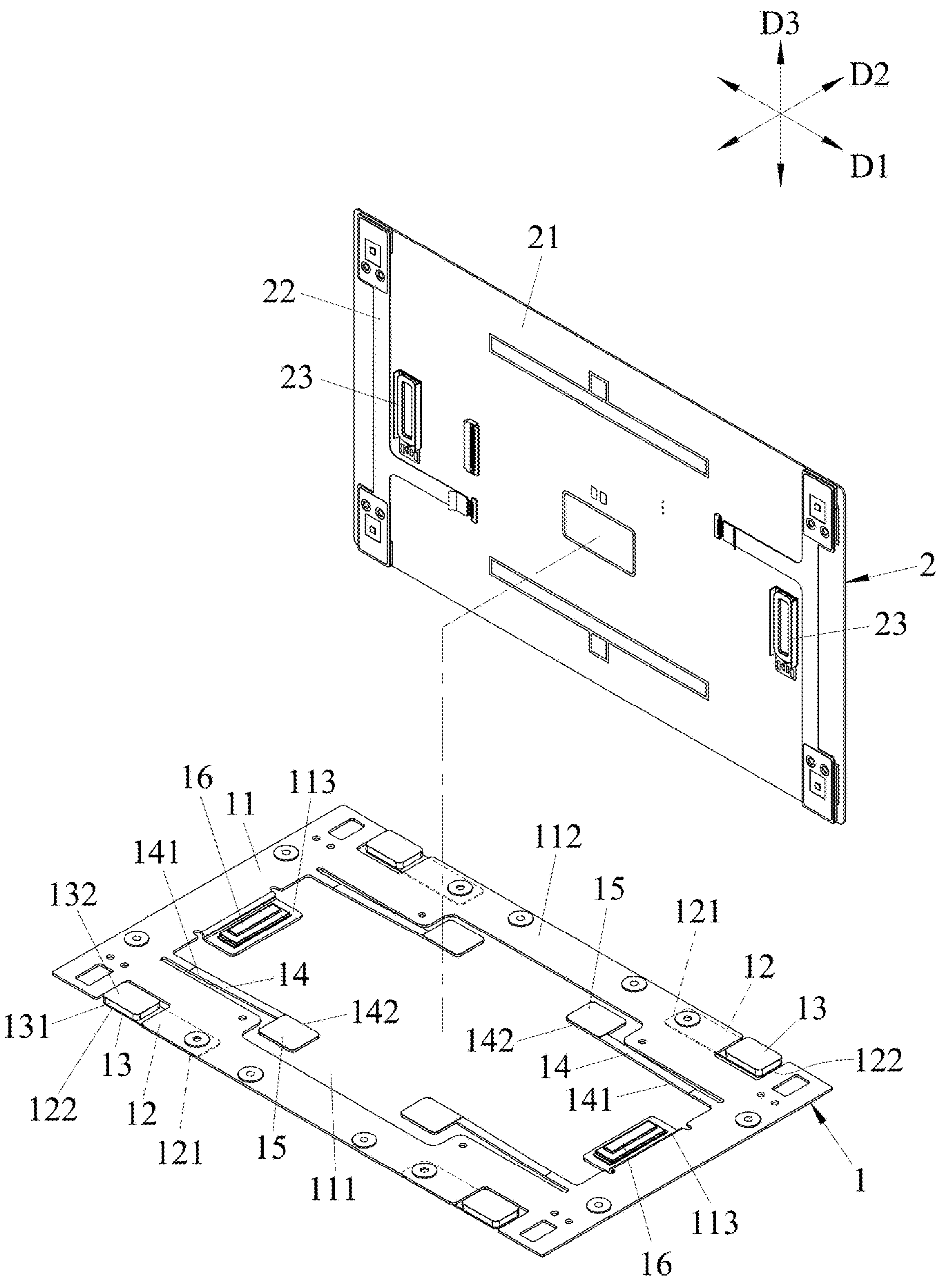
FIG. 3 is an exploded perspective view of the embodiment illustrating a base unit and a touch circuit board unit of the electromagnetic vibration touch device.

Referring to FIGS. 2 and 3, the base unit 1 is fixed to the mount seat 9 and includes a base body 11, a plurality of outer arms 12, a plurality of outer connection members 13, a plurality of inner arms 14, a plurality of inner connection members 15, and at least one lower electromagnetic member 16. The base body 11 defines an inner opening 111. The plurality of outer arms 12 are fixedly connected to an outer end of the base body 11, are flexible, and extend in a left-right direction (D1). The plurality of outer connection members 13 are respectively and fixedly connected to the plurality of outer arms 12. The plurality of inner arms 14 are fixedly connected to an inner end of the base body 11, are flexible, and extend in the left-right direction (D1) into the inner opening 111. The plurality of inner connection members 15 are respectively and fixedly connected to the plurality of inner arms 14. The at least one lower electromagnetic member 16 is fixedly connected to a top end of the base body 11.

In this embodiment, referring to FIGS. 3, 4, 5, and 6, the base unit 1 includes four outer arms 12 fixedly connected to the outer end of the base body 11, four outer connection members 13 respectively and fixedly connected to the four outer arms 12, four inner arms 14 fixedly connected to the inner end of the base body 11, four inner connection members 15 respectively and fixedly connected to the four inner arms 14, and two lower electromagnetic members 16 that are fixedly connected to the top end of the base body 11 and that are spaced apart from each other in the left-right direction (D1). Each of the four outer connection members 13 has a support portion 131 protruding outwardly of the base body 11, and a connection portion 132 disposed on a top end of the support portion 131. In some variant embodiments, a quantity of the lower electromagnetic members 16 may be one or greater than two.

Figure 4:
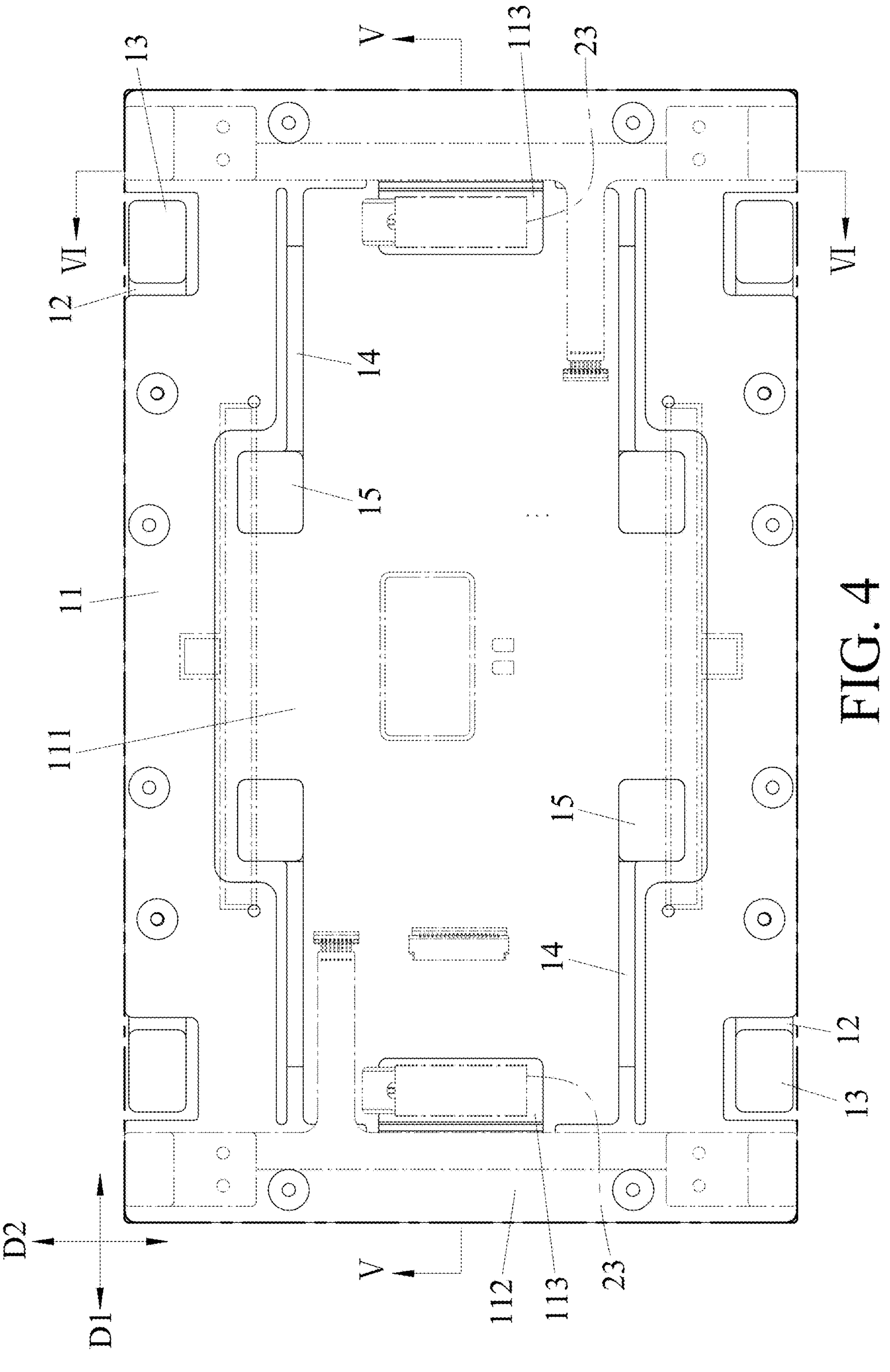
FIG. 4 is a bottom view illustrating the electromagnetic vibration touch device of the embodiment with omission of a cover plate of the electromagnetic vibration touch device.
Figure 5:
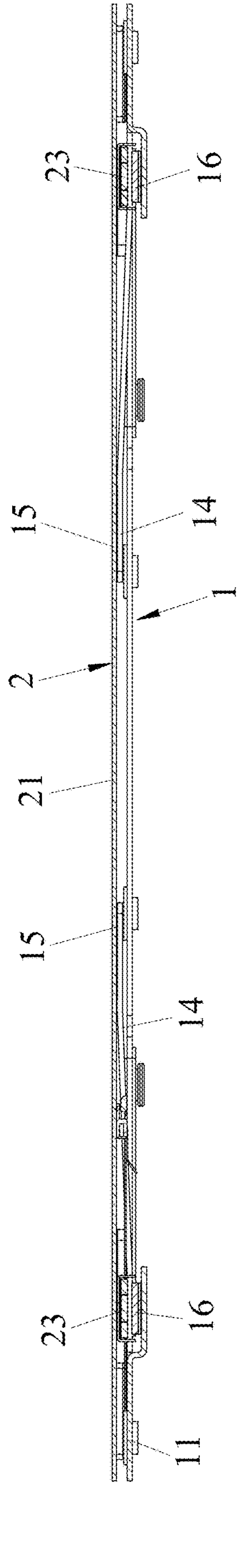
FIG. 5 is a schematic sectional view taken along line V-V of FIG. 4.
Figure 6:
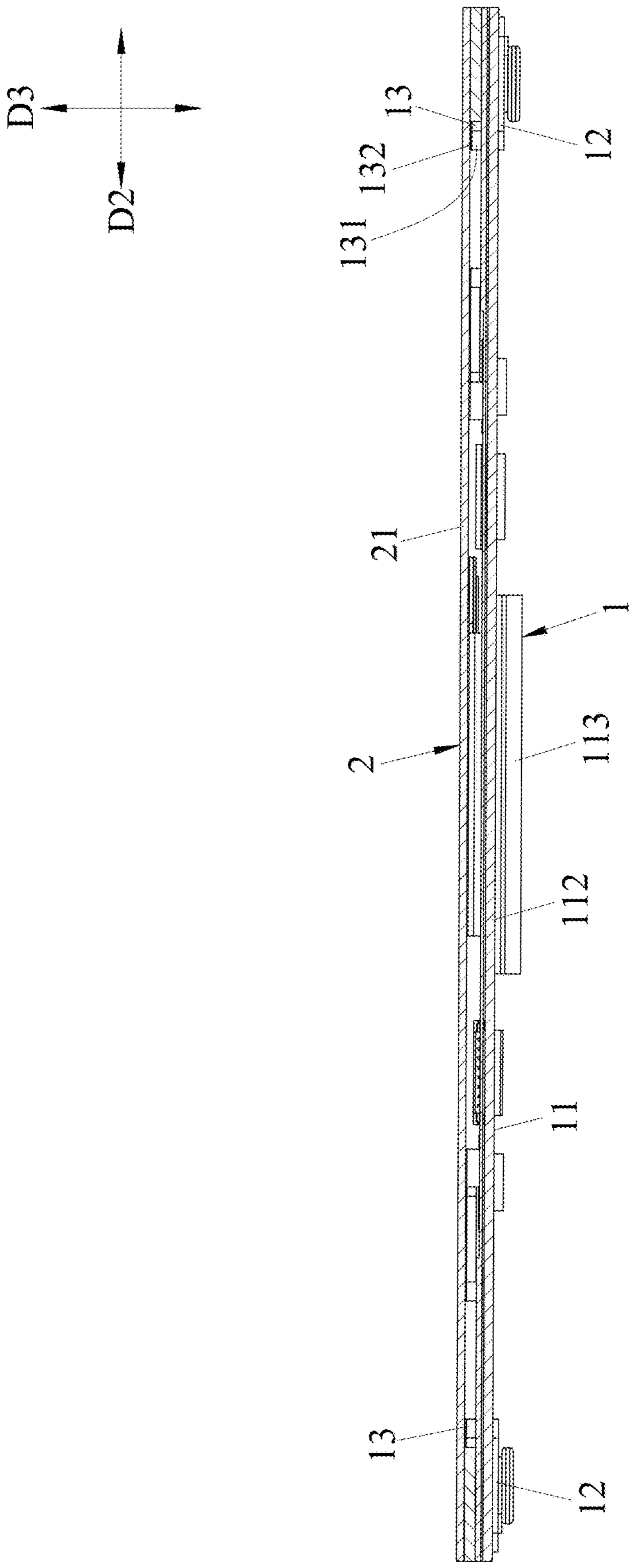
FIG. 6 is a schematic sectional view taken along line VI-VI of FIG. 4.

As shown in FIGS. 3 and 4, the base body 11 is hollow, and has a frame portion 112 that surrounds the inner opening 111, and two extension portions 113 that extend from the frame portion 112 into the inner opening 111 and are spaced apart from each other in the left-right direction (D1). In this embodiment, the two lower electromagnetic members 16 are fixedly and respectively connected to the two extension portions 113.

The four outer arms 12 are disposed outside the inner opening 111. Each of the plurality of outer arms 12 has an outer fixed end 121 that is fixedly connected to the base body 11, and an outer free end 122 that is opposite to the outer fixed end 121. The four outer connection members 13 are respectively and fixedly connected to the outer free ends 122 of the plurality of outer arms 12.

The four inner arms 14 are respectively proximate to the four outer arms 12. Each of the four inner arms 14 has an inner fixed end 141 that is fixedly connected to the base body 11, and an inner free end 142 that is opposite to the inner fixed end 141. The four inner connection members 15 are respectively and fixedly connected to the inner free ends 142 of the four inner arms 14.

The touch circuit board unit 2 includes a circuit board body 21, a touch circuit 22, and two upper electromagnetic members 23. The circuit board body 21 is fixedly connected to the four outer connection members 13 and the four inner connection members 15. The touch circuit 22 is disposed on the circuit board body 21. The two upper electromagnetic members 23 are fixedly connected to the bottom end of the circuit board body 21, and respectively face the two lower electromagnetic members 16. In variant embodiments, a quantity of the upper electromagnetic members 23 may be one or greater than two.

In this embodiment, each of the four outer connection members 13 fixedly interconnects the circuit board body 21 and a respective one of the four outer arms 12, and each of the four inner connection members 15 fixedly interconnects the circuit board body 21 and a respective one of the four inner arms 14. As a result, the circuit board body 21 is fixedly connected to the four outer arms 12 and the four inner arms 14, so the circuit board body 21 is prevented from shifting in the left-right direction (D1) or a front-rear direction (D2) substantially perpendicular to the left-right direction.

The touch circuit 22 is electrically connected to the two lower electromagnetic members and the two upper electromagnetic members 23, and is operable for generating a magnetic repulsive force between the two lower electromagnetic member 16 and the two upper electromagnetic member 23 in a top-bottom direction (D3) substantially perpendicular to the left-right direction (D1) and the front-rear direction (D2). In this embodiment, the touch circuit 22 is an integrated circuit, and may include a capacitive sensing layer (not shown), a controller (not shown), and conductive wires (not shown). Because structural features of the touch circuit 22 is well known in the art, further details of the touch circuit 22 are omitted herein for the sake of brevity.

Referring to FIGS. 2 and 3, the cover plate 3 is fixedly connected to a top surface of the touch circuit board unit 2. In this embodiment, the cover plate 3 is made of a glass material.

In practice, when the touch circuit 22 detects that the circuit board body 21 is driven to move toward the base body 11, the two lower electromagnetic members 16 and the two upper electromagnetic members 23 are controlled and are electrically energized, such that the magnetic repulsive force is generated between the two lower electromagnetic members 16 and the two upper electromagnetic members 23 in the top-bottom direction (D3), thereby providing a tactile feedback that is similar to one that is generated by physical vibrations.

In summary, the electromagnetic vibration touch device of the disclosure has the following effects.

1. By virtue of the configurations of the four outer arms 12, the four inner arms 14, the two lower electromagnetic members 16, and the two upper electromagnetic members 23, when the touch circuit 22 detects that the circuit board body 21 moves toward the base body 11, the two lower electromagnetic members 16 and the two upper electromagnetic members 23 are controlled and cooperatively generate the magnetic repulsive force in the top-bottom direction (D3), thereby providing a satisfactory tactile feedback.
2. Because each of the four outer connection members 13 fixedly interconnects the circuit board body 21 and a respective one of the four outer arms 12, and because each of the four inner connection members 15 fixedly interconnects the circuit board body 21 and a respective one of the four inner arms 14, when the circuit board body 21 moves toward the base body 11, the circuit board body 21 is prevented from shifting in the left-right direction (D1) or the front-rear direction (D2), thereby providing a balanced pressing sensation.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electromagnetic vibration touch device, comprising:

a base unit including a base body that defines an inner opening, a plurality of outer arms that are fixedly connected to an outer end of said base body, that are flexible, and that extend in a left-right direction, a plurality of outer connection members that are respectively and fixedly connected to said plurality of outer arms, a plurality of inner arms that are fixedly connected to an inner end of said base body, that are flexible, and that extend in the left-right direction into said inner opening, a plurality of inner connection members that are respectively and fixedly connected to said plurality of inner arms, and at least one lower electromagnetic member that is fixedly connected to a top end of said base body; and a touch circuit board unit including a circuit board body that is fixedly connected to said plurality of outer connection members and said plurality of inner connection members, a touch circuit that is disposed on said circuit board body, and at least one upper electromagnetic member that is fixedly connected to a bottom end of said circuit board body, and that faces said at least one lower electromagnetic member;

wherein said touch circuit is electrically connected to said at least one lower electromagnetic member and said at least one upper electromagnetic member and is operable for generating a magnetic repulsive force between said at least one lower electromagnetic member and said at least one upper electromagnetic member in a top-bottom direction substantially perpendicular to the left-right direction.

2. The electromagnetic vibration touch device as claimed in claim 1, further comprising a cover plate that is fixedly connected to a top surface of said touch circuit board unit.

3. The electromagnetic vibration touch device as claimed in claim 2, wherein said cover plate is made of a glass material.

4. The electromagnetic vibration touch device as claimed in claim 1, wherein:

each of said plurality of outer arms has an outer fixed end that is fixedly connected to said base body, and an outer free end that is opposite to said outer fixed end;

each of said plurality of inner arms has an inner fixed end that is fixedly connected to said base body, and an inner free end that is opposite to said inner fixed end;

said plurality of outer connection members are respectively and fixedly connected to said outer free ends of said plurality of outer arms; and said plurality of inner connection members are respectively and fixedly connected to said inner free ends of said plurality of inner arms.

5. The electromagnetic vibration touch device as claimed in claim 1, wherein said base unit includes four outer arms and four outer connection members, each of said four outer connection members fixedly interconnecting said circuit board body and a respective one of said four outer arms.

6. The electromagnetic vibration touch device as claimed in claim 5, wherein said base unit includes four inner arms and four inner connection members, said four inner arms being respectively proximate to said four outer arms, each of said four inner connection members fixedly interconnecting said circuit board body and a respective one of said four inner arms.

7. The electromagnetic vibration touch device as claimed in claim 1, wherein:

said at least one lower electromagnetic member includes two lower electromagnetic members that are fixedly connected to said top end of said base body and that are spaced apart from each other in the left-right direction; and said at least one upper electromagnetic member includes two upper electromagnetic members that are fixedly connected to said bottom end of said circuit board body, and that respectively face said two lower electromagnetic members.

8. The electromagnetic vibration touch device as claimed in claim 7, wherein:

said base body has a frame portion that surrounds said inner opening, and two extension portions that extend from said frame portion into said inner opening; and said two lower electromagnetic members are fixedly and respectively connected to said two extension portions.

* * * * *